United States Patent
Tanaka et al.

[11] Patent Number: 6,067,380
[45] Date of Patent: May 23, 2000

[54] IMAGE COMPRESSION METHOD

[75] Inventors: Tetsuo Tanaka, Kasuga; Seiichiro Hiratsuka, Kitakyushu, both of Japan

[73] Assignee: Matsushita Electric Industrial Co., Ltd., Osaka, Japan

[21] Appl. No.: 08/867,397

[22] Filed: Jun. 2, 1997

[30]     Foreign Application Priority Data

Jun. 6, 1996  [JP]  Japan .................................. 8-144047

[51] Int. Cl.$^7$ ........................................................ G06K 9/36
[52] U.S. Cl. ........................................................ 382/232
[58] Field of Search .................................. 382/170, 232, 382/233, 234, 235, 236, 237, 238, 239; 358/261.1, 261.3, 426, 427, 432, 433

[56]           References Cited

U.S. PATENT DOCUMENTS

| | | | |
|---|---|---|---|
| 5,259,042 | 11/1993 | Matsuki et al. | 382/237 |
| 5,442,458 | 8/1995 | Rabbani et al. | 358/426 |
| 5,621,543 | 4/1997 | Oomoto | 358/455 |
| 5,754,676 | 5/1998 | Komiya et al. | 382/170 |

*Primary Examiner*—Jose L. Couso
*Attorney, Agent, or Firm*—Stevens, Davis, Miller & Mosher, L.L.P.

[57]           ABSTRACT

An image with multiple gradations is divided into a plurality of pixel blocks each of which comprises a plurality of pixels. Pixel data of the pixel block are compressed to two representing values indicative of pixel levels and a binary block pattern by block approximation coding. Representing patterns of which the number is less than that of the block patterns are set previously. A plurality of block patterns having a specific relationship with one of the representing patterns are replaced with the one of the representing patterns, so that the block patterns are compressed.

15 Claims, 11 Drawing Sheets

FIG.5

| RESOLUTION PATTERN | REPRESENTING PATTERN | REPRESENTING PATTERN NUMBER |
|---|---|---|
| $\begin{array}{\|c\|c\|c\|c\|}\hline 0&0&0&0\\\hline 0&0&0&0\\\hline 0&0&0&0\\\hline 0&0&0&0\\\hline\end{array}$ $\begin{array}{\|c\|c\|c\|c\|}\hline 1&0&0&0\\\hline 0&0&0&0\\\hline 0&0&0&0\\\hline 0&0&0&0\\\hline\end{array}$ ⋮ $\begin{array}{\|c\|c\|c\|c\|}\hline 0&0&0&0\\\hline 0&0&0&0\\\hline 0&0&0&0\\\hline 0&0&0&1\\\hline\end{array}$ | $\begin{array}{\|c\|c\|c\|c\|}\hline 0&0&0&0\\\hline 0&0&0&0\\\hline 0&0&0&0\\\hline 0&0&0&0\\\hline\end{array}$ | 0 |
| ⋮ | ⋮ | ⋮ |
| ⋮ $\begin{array}{\|c\|c\|c\|c\|}\hline 1&1&1&1\\\hline 1&1&1&1\\\hline 1&1&1&1\\\hline 1&1&1&1\\\hline\end{array}$ | $\begin{array}{\|c\|c\|c\|c\|}\hline 1&1&1&1\\\hline 1&1&1&1\\\hline 1&1&1&1\\\hline 1&1&1&1\\\hline\end{array}$ | 4095 |

FIG.8
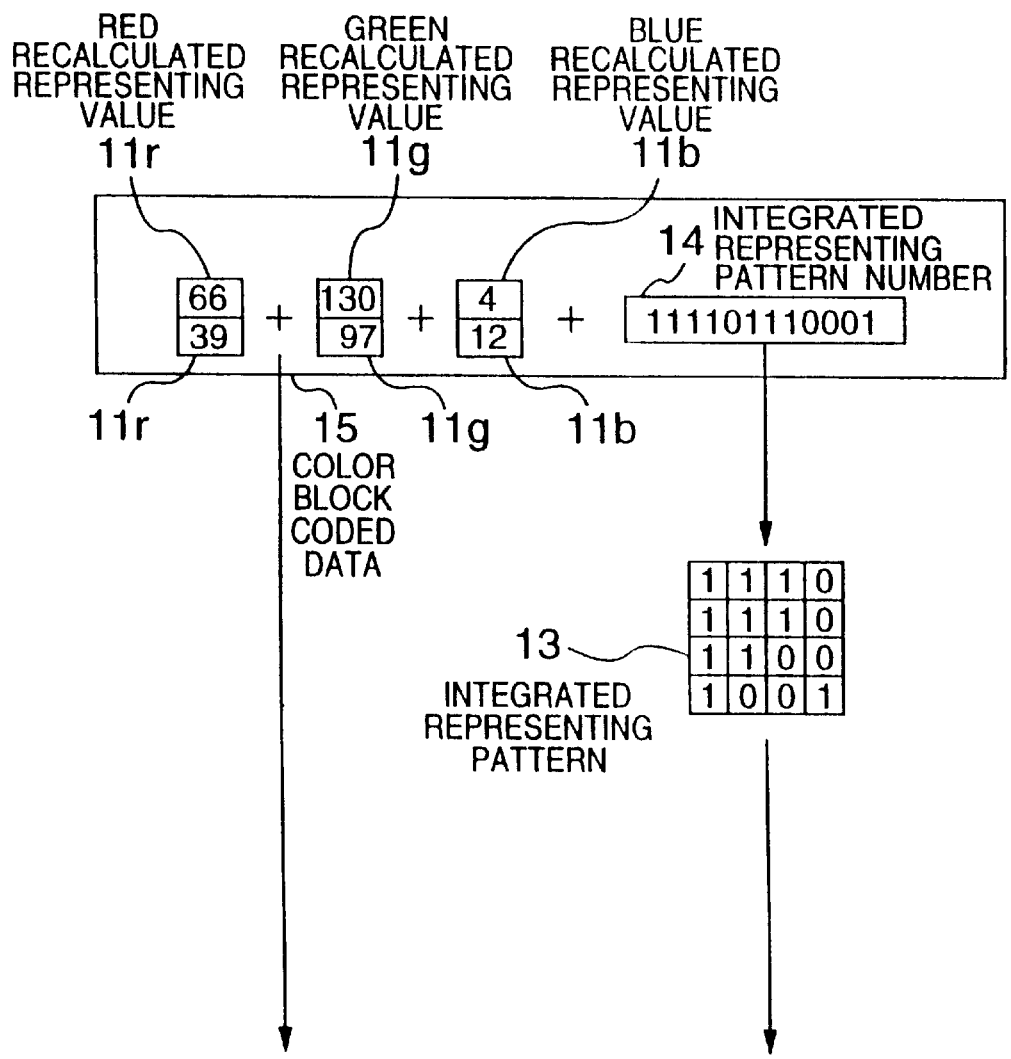
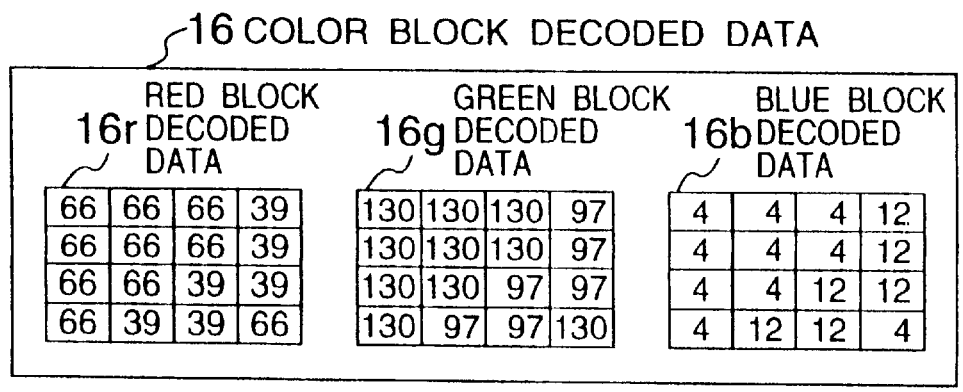

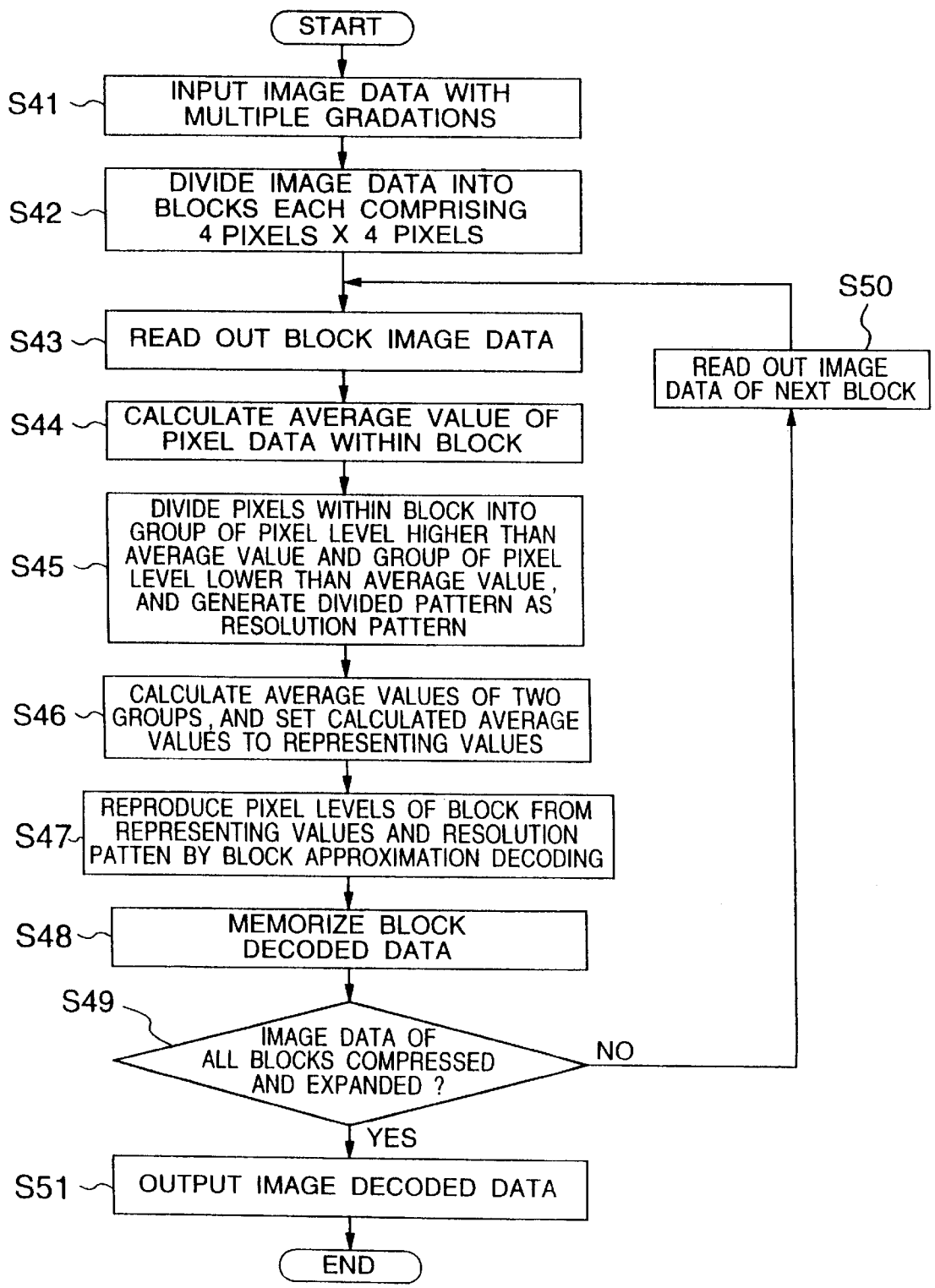

IMAGE COMPRESSION METHOD

BACKGROUND OF THE INVENTION

1. Field of the Invention

The present invention relates to a method of compressing an image with multiple gradations.

2. Description of the Related Art

Recently, the amount of data used to form an image has increased remarkably as color images became widespread and subsequently began to have multiple gradations. Concurrently with an increase in the amount of data in an image, a variety of data compression methods such as encoding have been studied earnestly in order to decrease the amount of data in an image. Heretofore, there have been proposed various methods of compressing an image. According to these methods, an original image can be accurately restored after an image has been coded by some suitable means such as compression. However, an image compression method which is generally used under the circumstances that an original image need not be restored with a high accuracy has not been studied yet so earnestly.

Heretofore, a method of compressing an image, known as block approximation coding, in which an image with multiple gradations is divided into pixel blocks each pixel block comprises a plurality of adjacent pixels. The image is compressed by expressing the pixel block with two representing values and a block pattern obtained by a binary processing.

The conventional block approximation coding will hereinafter be described with reference to FIGS. 10 and 11.

FIG. 10 is a schematic diagram used to explain a conventional method of compressing and expanding an image. Image data is recognized as a block of every pixel. All pixels are divided into the blocks each of which comprises 4×4=16 pixels as shown by block image data 17 in FIG. 10, and the image data is processed at every block. A numerical value in the block represents a gradation of a pixel data.

FIG. 11 is a flowchart to which reference will be made in explaining the above-mentioned conventional method of compressing and expanding image data. Referring initially to FIG. 11, and following the start of operation, control goes to a step S41, at which image data with multiple gradations is inputted. Then, control goes to the next step S42, at which the image data is divided into a plurality of blocks each of which comprises 4 pixels×4 pixels as shown in FIG. 10. Then, control goes to the next step S43, at which image data of the first block is read out, and the block image data 17 shown in FIG. 10 is obtained. Then, control goes to the next step S44, at which an average value of 16 pixel data within the block is calculated. Control goes to the next step S45, whereat, as shown by a resolution pattern 19 in FIG. 10, the pixels within the block are divided into a group (blocks shown by 1) of pixel level higher than the average level and a group (blocks shown by 0) of pixel level below the average level, thereby resulting in the divided patterns being generated as the resolution pattern 19. Then, control goes to the next step S46. At the step S46, calculating average values of the two groups in the resolution pattern 19, the average value of the group of 1 is obtained as 130 from the block image data 17, and the average value of the group of 0 is obtained as 97 from the block image data 17. Then, control goes to the next step S46, at which these values are set to representing values 18. According to the aforementioned processing, the block image data 17 comprising 16 pixels is converted into the two representing values 18 and the binary resolution pattern 19.

Subsequently, control goes to the next step S47, at which the image data compressed by the above-mentioned compression processing is expanded. In this image data expansion processing of the step S47, block decoded data 20 which indicates the pixel levels of the block is reproduced from the resolution pattern 19 and the representing values 18 by block approximation decoding. Control goes to the next step S48, at which the block decoded data 20 is memorized.

As set forth above, the image expansion and compression of the first block are finished, and it is determined at a decision step S49. Then, control goes to the next step S50 at which image data of the next block is read out. Then, control goes back to the step S43, and the steps S43 to S48 are repeated. When the compression and expansion of image data of all blocks are already finished as represented by a YES at the decision step S49, then control goes to the next step S51, at which the above-mentioned image data are outputted as image decoded data. Then, the process of image compression and image expansion is ended.

However, according to the above-mentioned block approximation coding, the resolution pattern is processed only by the binary processing, but not processed by compression. Therefore, there is still yet a room to increase a compression rate much more.

SUMMARY OF THE INVENTION

An object of the present invention is to provide an image compression method capable of increasing a compression rate with respect to a resolution pattern obtained by block approximation coding.

To attain the above-mentioned object, in an image compression method according to the present invention, image data comprising pixels having multiple gradations is compressed at every block in which one block comprises 4×4=16 pixels.

Initially, gradation data consisting of 16 pixels within one block are averaged, and 16 pixels are divided to provide a pixel group having gradation data larger than the average value and a pixel group having gradation data smaller than the average value.

Then, average values of gradation data within the former group and the latter group are calculated, respectively, and resultant calculated values are set to representing values of the respective groups. Besides, if pixel data are larger than the average value, then they are replaced with 1, and if pixel data are smaller than the average value, then they are replaced with 0. Therefore, the pixel data is generated as a 16-bit resolution pattern. In this manner, image data of one block are replaced with the two representing values and the 16-bit resolution pattern.

Subsequently, the 16-bit resolution pattern is classified at every resolution pattern having a similar pattern, and is replaced with one representing pattern of 16 bits at every classified resolution pattern, thereby being compressed to $1/16$.

Finally, the 16-bit representing pattern is replaced with a corresponding 12-bit representing pattern number with the result that image data is further compressed in the form of $(1/16) \times (12/16) = 3/64$.

All image data are compressed by effecting the above-mentioned processing on each block.

Therefore, since image data of one block with multiple gradations formed of 16 pixels is replaced with the two representing values and the 12-bit representing pattern, it becomes possible to compress image data with a high compression efficiency.

In order to realize the above-mentioned processing, the image compression method according to the present invention comprises a step of dividing image data with multiple gradations into pixel blocks, each of the pixel blocks comprising a plurality of pixels; a step of compressing the pixel data of the pixel block to provide two representing values indicative of pixel levels and one of binary block patterns by block approximation coding; a step of previously setting representing patterns whose number is less than the number of the binary block patterns; and a step of compressing the binary block patterns by replacing said one of the binary block patterns, which has a specific relationship with one of the representing patterns, with the one of representing patterns.

In the image compression method according to the present invention, if one pixel block is comprised of N bits (N is a natural number), then a binary block pattern has 2N patterns in total. Whereas, if a plurality of block patterns are correspondingly replaced with one representing pattern, then an approximate image can be expressed by 2M patterns (M is a natural number satisfying M<N).

BRIEF DESCRIPTION OF THE DRAWINGS

FIG. 5 is a schematic diagram showing representing patterns according to the first embodiment of the present invention;

FIG. 8 is a schematic diagram used to explain the image expansion method according to the second embodiment of the present invention;

FIG. 11 is a flowchart to which reference will be made in explaining a conventional image compression and expansion method.

DESCRIPTION OF THE PREFERRED EMBODIMENTS

First Embodiment

Figure 1:
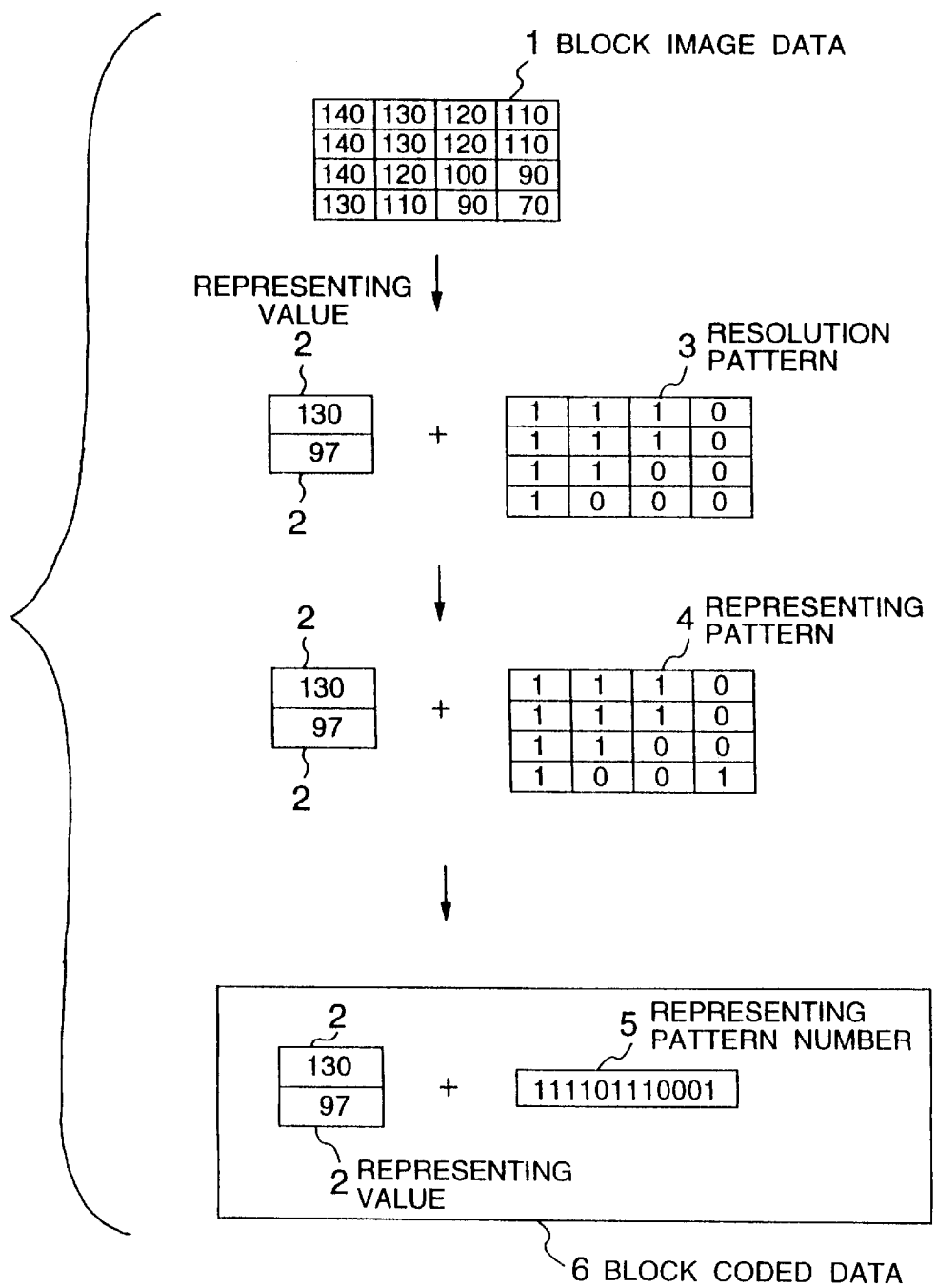
FIG. 1 is a schematic diagram used to explain an image compression method according to a first embodiment of the present invention.
Figure 2:
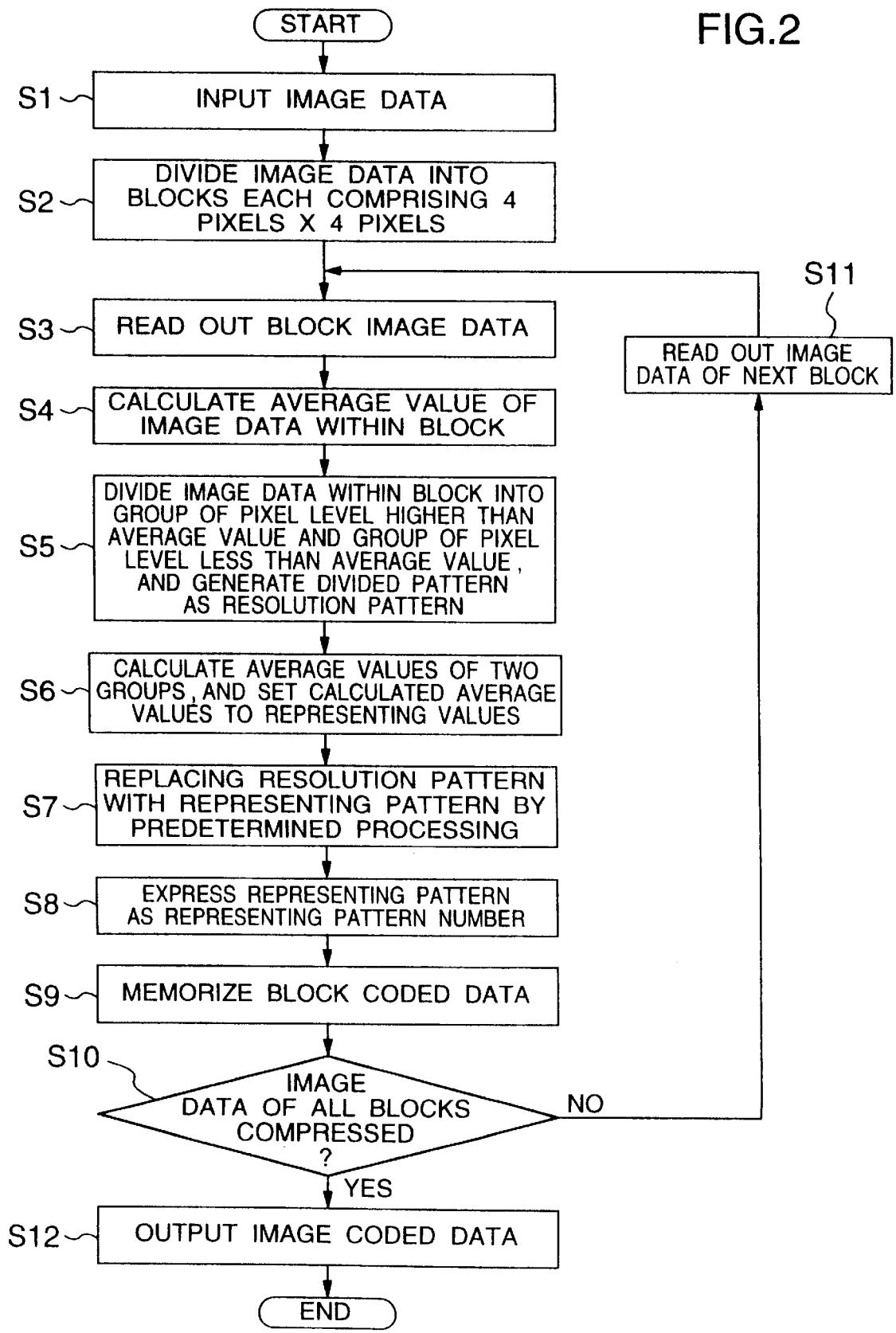
FIG. 2 is a flowchart to which reference will be made in explaining the image compression method according to the first embodiment of the present invention.
Figure 3:
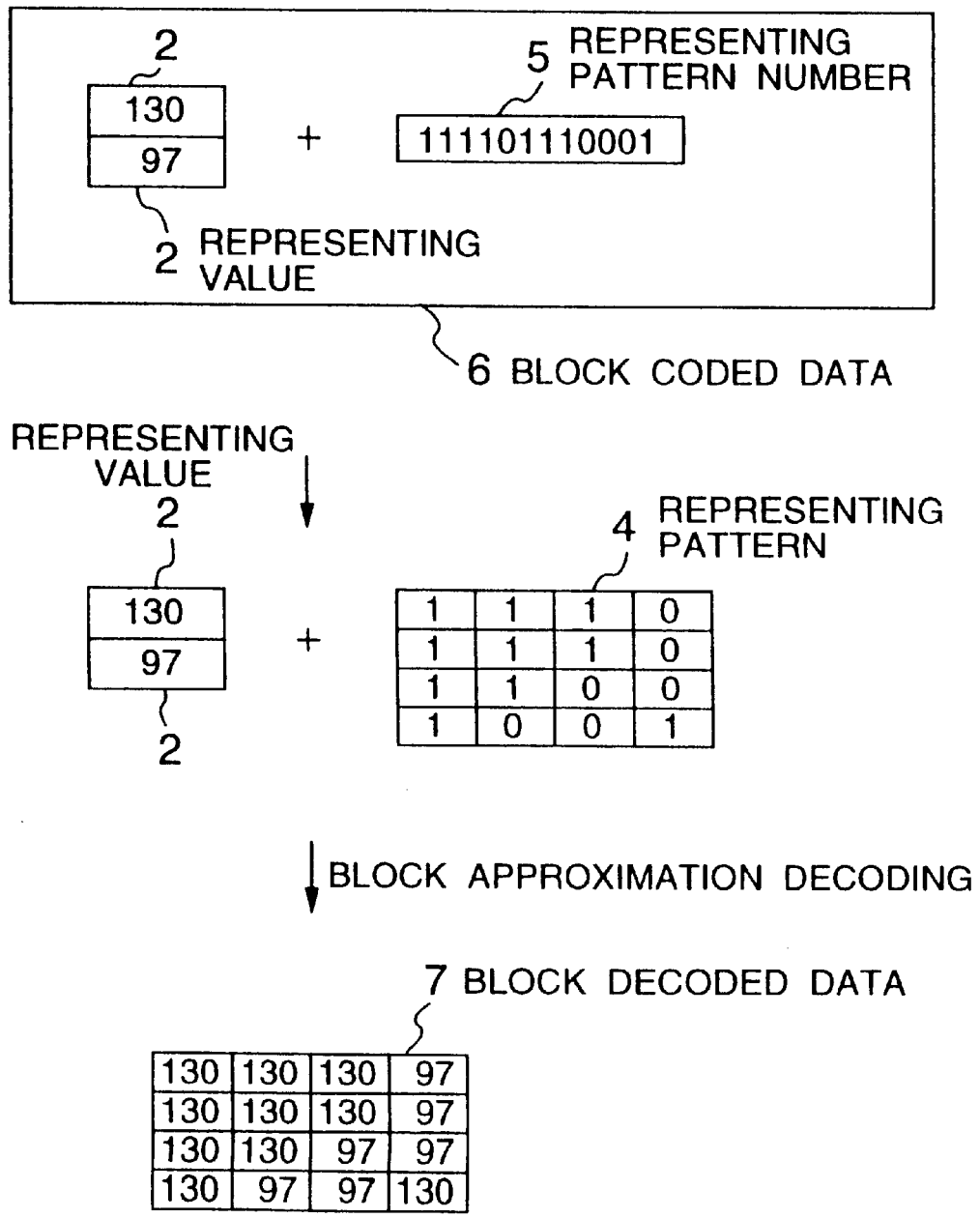
FIG. 3 is a schematic diagram useful for explaining an image expansion method according to the first embodiment of the present invention.
Figure 4:
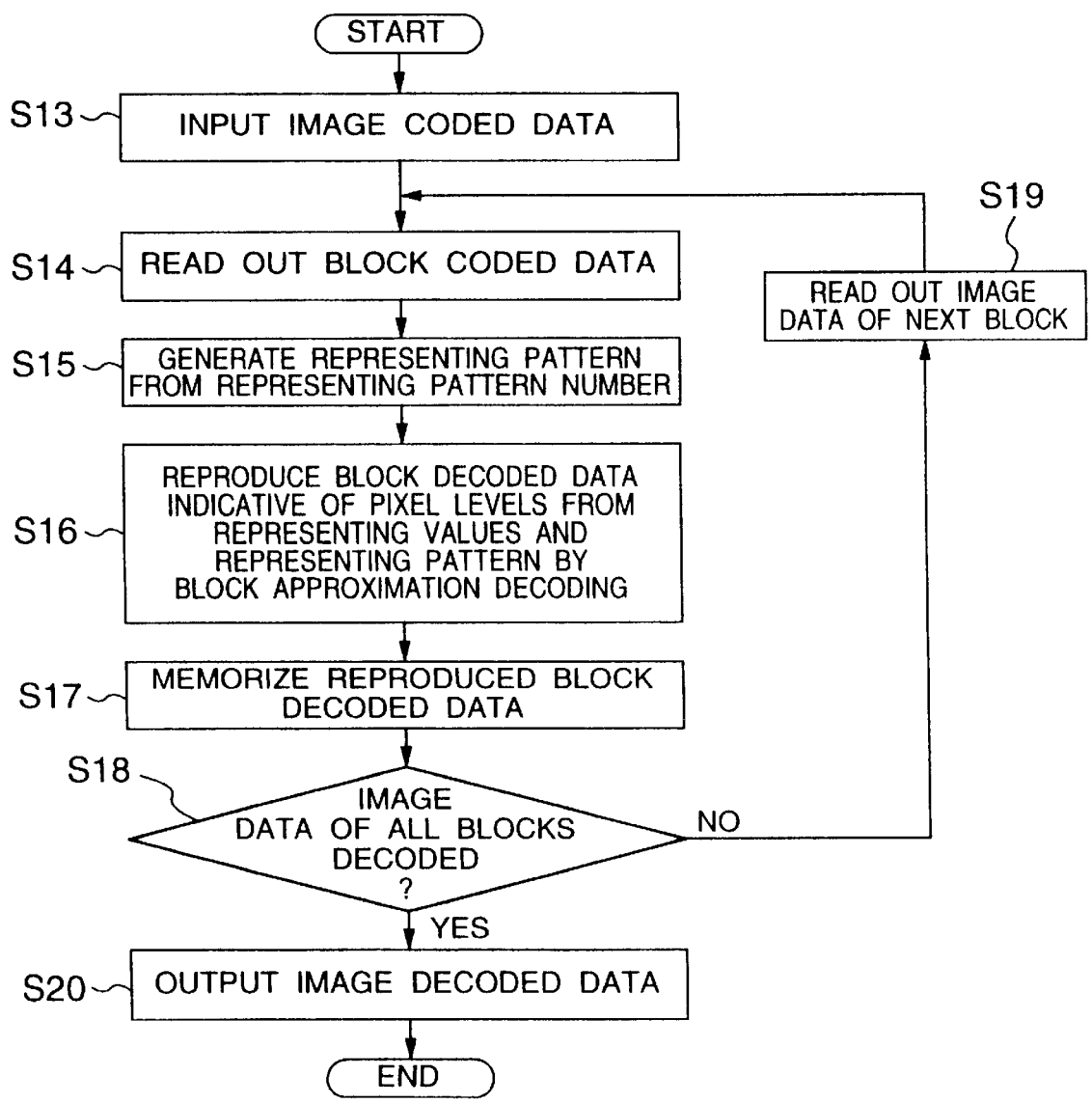
FIG. 4 is a flowchart to which reference will be made in explaining the image expansion method according to the first embodiment of the present invention.

A first embodiment of the present invention will hereinafter be described with reference to FIGS. 1 to 5. FIG. 1 is a schematic diagram used to explain an image compression method according to the first embodiment of the present invention; FIG. 2 is a flowchart to which reference will be made in explaining the image compression method according to the first embodiment of the present invention; FIG. 3 is a schematic diagram used to explain an image expansion method according to the first embodiment of the present invention; FIG. 4 is a flowchart to which reference will be made in explaining the image expansion method according to the first embodiment of the present invention; and FIG. 5 is a schematic diagram used to explain representing patterns according to the first embodiment of the present invention. The first embodiment of the present invention will hereinafter be described in detail.

Referring initially to FIGS. 1 and 2, and following the start of operation, image data with multiple gradations is inputted at a step S1 in the flowchart of FIG. 2. Then, control goes to the next step S2 whereat the inputted image data is divided into a plurality of blocks each of which comprises 4 pixels×4 pixels, and then the following processing will be carried out in the block unit.

At the next step S3, pixel data of the first block is read out, and the block image data 1 shown in FIG. 1 is obtained. Then, the block image data 1 is processed by block approximation coding in the following manner.

At a step S4, an average value of pixel data within the first block is calculated. In this case, the average value of pixel data within the first block is about 116. Then, control goes to the next step S5, at which the pixels within the first block are classified to provide a group of pixel level larger than the average value (i.e. a group of pixels having the pattern 1) and a group of pixel level smaller than the average value (i.e. a group of pixels having the pattern 0), thereby resulting in the divided pattern being generated as a resolution pattern 3 in FIG. 1.

Then, control goes to the next step S6, whereat average values of pixel data in the above-mentioned two groups are calculated from the block image data 1, and resultant average values are set to representing values 2. In this case, the average value of the pixel group having the pattern 1 is 130, and the average value of the pixel group having the pattern 0 is 97.

The block approximation coding is completed by the above-mentioned process. According to the block approximation coding, image data of block comprising 4 pixels×4 pixels is converted into the representing values 2 formed of the average values of the two pixel levels and the binary 16-bit resolution pattern 3.

In the next step, the resolution pattern 3 obtained by the block approximation coding is compressed. As a method of compressing the resolution pattern 3, there is considered an image compression system in which a Huffman code is assigned in response to a frequency at which the resolution pattern 3 appears after such frequency at which the resolution pattern 3 appears was investigated. According to the above-mentioned image compression system, however, it is unavoidable that an image compression circuit and an image expansion circuit become large in circuit scale and that data becomes difficult to handle because a Huffman code is a variable code. Therefore, according to the present invention, image compression in which a circuit scale is small and data becomes easy to handle is carried out although the image compression according to the present invention is an irreversible image compression.

Concretely, at a step S7, the resolution pattern 3 is divided at every similar resolution pattern, and replaced with a representing pattern 4 which becomes different at every group. Then, control goes to the next step S8, at which the representing pattern 4 is expressed as a representing pattern number 5. Control goes to the next step S9, at which the representing pattern number 5 is memorized together with the representing values 2 of the two pixel levels as block coded data 6. Thus, the resolution pattern 3 of 4 pixels×4 pixels is compressed to the representing pattern number 5 shown by 12-bit data. The manner in which this representing pattern is selected will be described more in detail later on.

In this way, the compression of image data of the first block is finished. Then, it is determined at the next decision step S10 whether or not the compression of image data of all blocks is finished. If the compression of image data of all blocks is not completed yet as represented by a NO at the decision step S10, then control goes to the next step S11, whereat image data of the next block is read out. Then, control goes back to the step S3, and the steps S3 to S9 are repeated. If the compression of image data of all blocks is finished as represented by a YES at the decision step S10, then control goes to the next step S12, whereat compressed data is outputted as image coded data. Then, the image compression process is ended.

While the image compression processing has been described so far, a method of expanding image data according to the first embodiment of the present invention will be described next with reference to FIGS. 3 and 4. Referring initially to FIG. 4, and following the start of operation, control goes to a step S13, at which the image coded data obtained according to the above-mentioned image compression method is inputted, and then the image coded data inputted is processed at the unit of the memorized blocks. Then, control goes to the next step S14, whereat coded data of the first block is read out, thereby resulting in block coded data 6 shown in FIG. 3 being obtained. In the next step S15, a representing pattern 4 is generated from the representing pattern number 5 that is a constituent of the block coded data 6. Then, control goes to the next step S16, whereat block decoded data 7 which indicates the pixel levels of the first block is reproduced from the representing pattern 4 and the representing values 2 by block approximation decoding. Control then goes to the next step S17, at which the produced block decoded data 7 is memorized.

Although the image data (block decoded data 7) of FIG. 3 reproduced by the image expansion becomes different from the image data (block image data 1) that is not yet compressed as shown in FIG. 1, such an error is almost negligible from a picture quality standpoint.

By the above-mentioned processing, the expansion of image data of the first block is ended. Then, it is determined in the next decision step S18 whether or not image data of all blocks are completely expanded. If image data of all blocks are not yet expanded fully as represented by a NO at the decision step S18, then control goes to the next step S19, at which image data of the next block is read out. Then, control goes back to the steps S14, and the above-mentioned steps S14 to S17 are repeated. If image data of all blocks are wholly expanded as represented by a YES at the decision step S18, then control goes to the next step S20, at which the expanded image data is outputted as image decoded data. Then, the image expansion process is ended.

The representing pattern used in the above-mentioned image compression method or the image expansion method and the manner in which such representing pattern is selected will be described in detail with reference to FIG. 5. The resolution pattern comprises 16-bit data pattern, and there are 65536 patterns in total. Representing patterns are denoted by corresponding representing pattern numbers.

Since the representing pattern number comprises 12-bit data pattern, there are 4096 representing pattern numbers, and there are also 4096 corresponding patterns in total. Accordingly, one representing pattern has a plurality of corresponding resolution patterns.

As a method of selecting a representing pattern corresponding to a plurality of resolution patterns, there is used a concept of error code correction based on the Hamming code method of information theory in which true data is searched for by correcting bits of a certain number within data if such data comprising a plurality of bits is data having an error.

Specifically, bits of a certain predetermined number are inverted with respect to a certain data, and a set of original data which become certain one different data are set to one group. Thus, these original data of one group can be regarded as being substantially equal to certain one data.

In FIG. 5, for example, a pattern in which all pixels within one block comprising 4×4=16 pixels are 0 and a pattern in which any one of pixels is 1 are set to a group. Then, all patterns within this group are replaced with representing patterns in which all pixels within one block are 0. Then, this representing pattern is further replaced with a corresponding representing pattern number, and this representing pattern number is obtained as 12-bit data.

Therefore, if the original data of one group is set to a plurality of resolution patterns and certain one different data is set to the representing pattern, then of the representing patterns, the resolution pattern in which bits of the number within a predetermined number are inverted can be regarded as being substantially equal to the representing pattern.

Such representing patterns can be efficiently obtained by equations. By way of example, representing patterns are obtained by the following equations (1-1) to (1-5) based on the Hamming code method:

$$y1 = y6 \wedge y9 \wedge y11 \wedge y12 \wedge y15 \wedge y16 \quad (1\text{-}1)$$

$$y2 = y7 \wedge y10 \wedge y12 \wedge y13 \wedge y16 \quad (1\text{-}2)$$

$$y3 = y6 \wedge y8 \wedge y9 \wedge y12 \wedge y13 \wedge y14 \wedge y15 \wedge y16 \quad (1\text{-}3)$$

$$y4 = y7 \wedge y9 \wedge y10 \wedge y13 \wedge y14 \wedge y15 \wedge y16 \quad (1\text{-}4)$$

$$y5 = y8 \wedge y10 \wedge y11 \wedge y14 \wedge y15 \wedge y16 \quad (1\text{-}5)$$

In the equations (1-1) to (1-5), y1 to y5 are high-order 5 bits of the resolution pattern, and y6 to y16 are low-order 11 bits of the resolution pattern. Moreover, in the equations (1-1) to (1-5), symbol ^ denotes exclusive-OR, and logical calculations of exclusive-OR are shown as follows:

$$0 \wedge 0 = 0 \quad (2\text{-}1)$$

$$0 \wedge 1 = 1 \quad (2\text{-}2)$$

$$1 \wedge 0 = 1 \quad (2\text{-}3)$$

$$1 \wedge 1 = 0 \quad (2\text{-}4)$$

As described above, 2048 representing patterns are selected by the Hamming code method. If an image need not be reproduced accurately from a picture quality stand-point, it is sufficient to use the above 2048 representing patterns. With respect to a natural picture, for example, it is not necessary to reproduce the resolution patterns perfectly.

However, with respect to a character picture, a deterioration of character picture becomes conspicuous so that resolution patterns have to be reproduced substantially perfectly. Moreover, in actual practice, the resolution patterns comprising the character picture do not use all 16-bit data patterns but use only resolution patterns of a certain limited number. Accordingly, in order to reproduce the character picture substantially accurately, a frequency at which actual resolution patterns constituting a character picture appear is investigated, and another 2048 representing patterns are further selected in the order of frequency so that they may not overlap the 2048 representing patterns that had been obtained by the above-mentioned Humming code method. Thus, 4096 representing patterns are selected, and the Humming code method is further used in order to match the 4096 representing patterns and 65536 resolution patterns with one another.

Initially, resolution patterns are arranged in the sequential order, and the first resolution pattern is read out. Similarly, representing patterns are arranged in the sequential order, and the first representing pattern is read out. Then, a bit number (hereinafter referred to as Hamming distance) which differs at the unit of bits is calculated by comparing the first resolution pattern and the first representing pattern. This Hamming distance is memorized, and a Hamming distance is calculated by comparing the next representing pattern and the resolution pattern. Then, the value of the resultant Hamming distance and the value of the previously-stored Hamming distance are compared with each other, and the Hamming distance of the smaller value is memorized as a minimum Hamming distance. In a like manner, Hamming distances of one resolution pattern with respect to all representing patterns are calculated, and one resolution pattern is matched with the representing pattern which indicates the minimum Hamming distance.

As described above, when one resolution pattern is matched with a certain representing pattern, a similar processing is effected on the next resolution pattern, and all 65536 resolution patterns are matched with all 4096 representing patterns.

By the above-mentioned processing, since 65536 resolution patterns 3 are converted into 4096 representing patterns 4, the data amount is compressed to $\frac{1}{16}$. Furthermore, since the resolution patterns 3 are further compressed into the 12-bit representing pattern numbers 5 which are made corresponding to the 16-bit representing patterns 4, the data amount is further compressed as $\frac{1}{16} \times (\frac{12}{16}) = \frac{3}{64}$. Thus, there can be achieved a remarkable effect that an image processing with a higher compression efficiency becomes possible.

Second Embodiment

Figure 6:
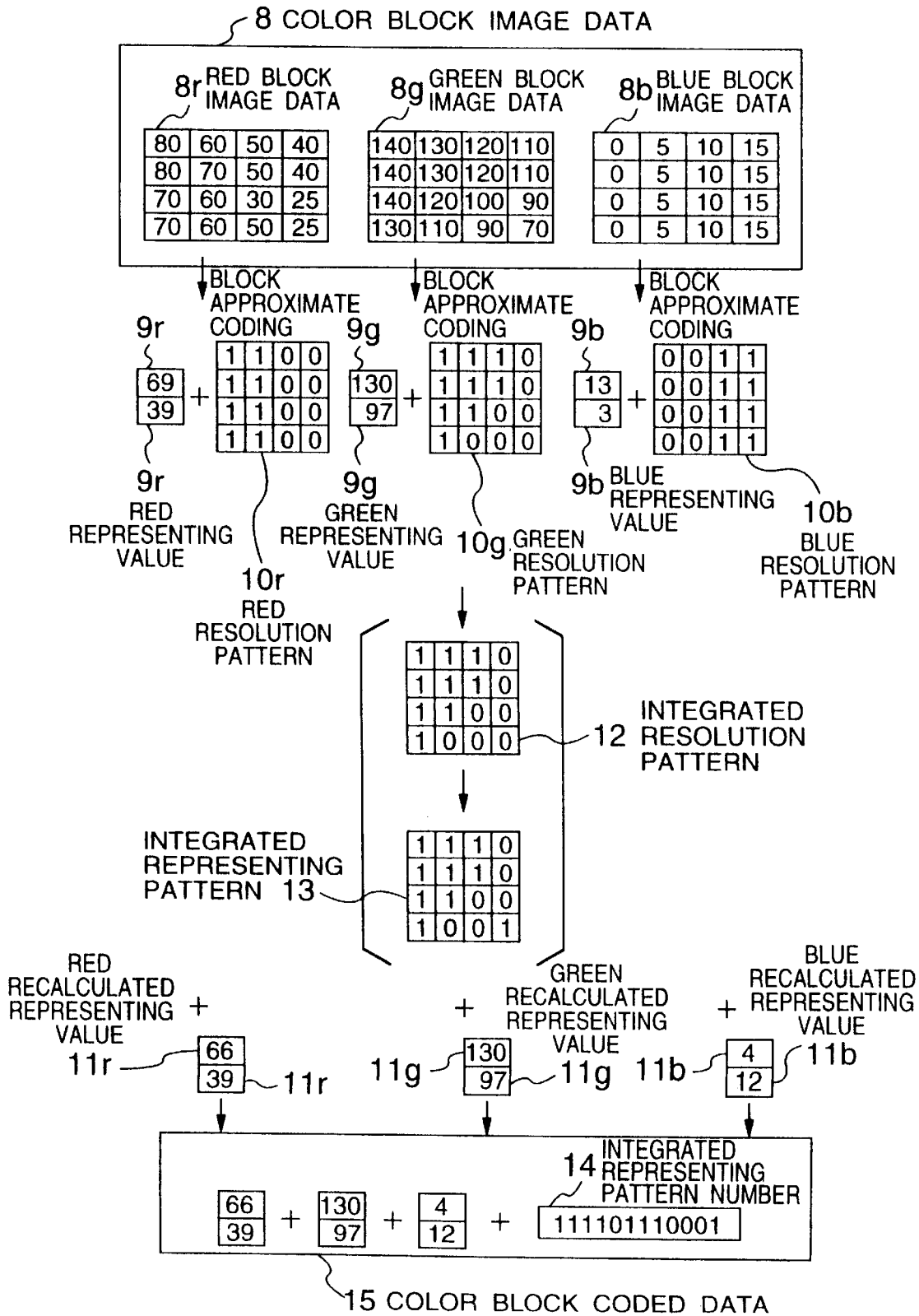
FIG. 6 is a schematic diagram used to explain an image compression method according to a second embodiment of the present invention.
Figure 7:
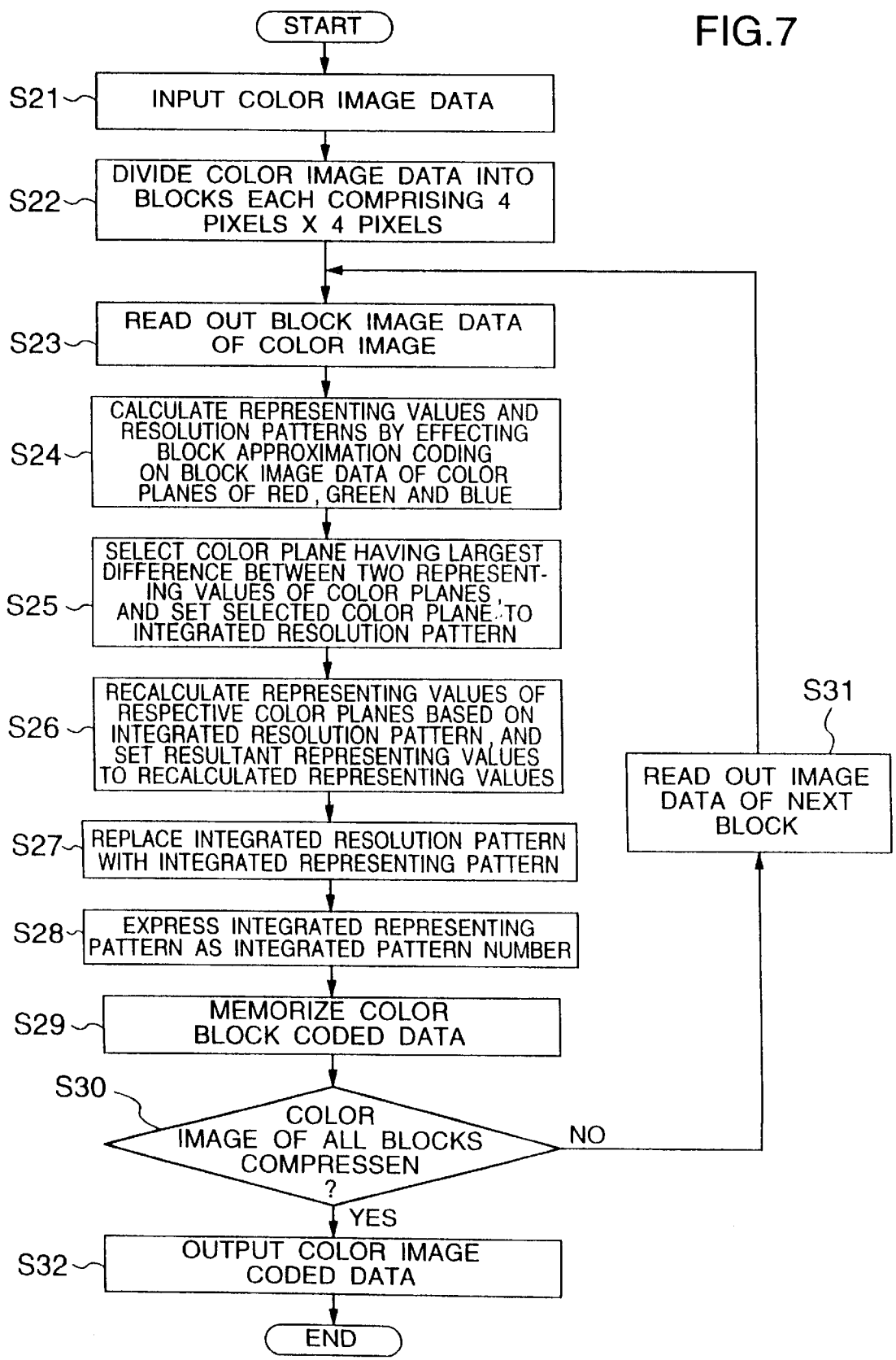
FIG. 7 is a flowchart to which reference will be made in explaining the image compression method according to the second embodiment of the present invention.
Figure 9:
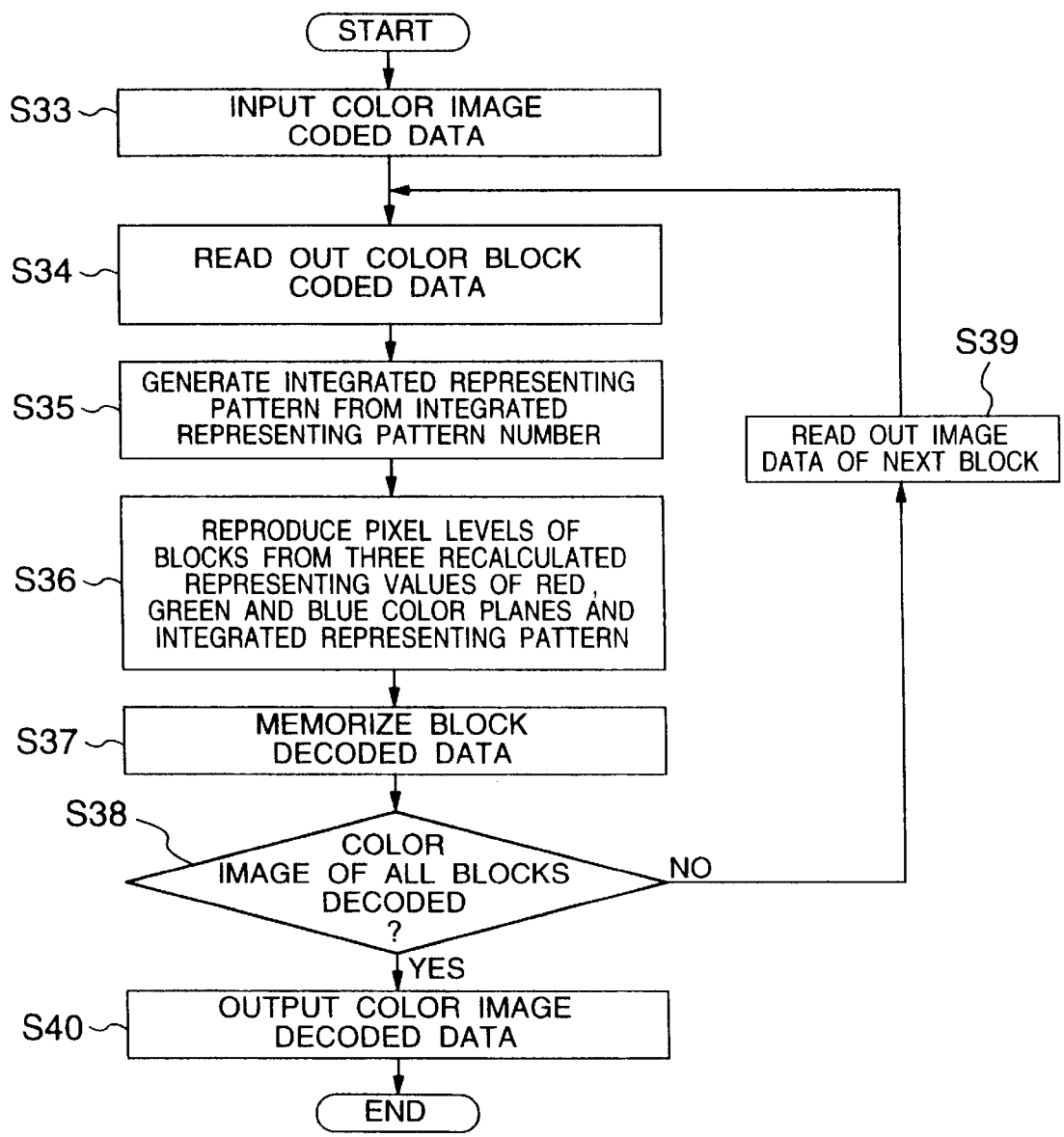
FIG. 9 is a flowchart to which reference will be made in explaining the image expansion method according to the second embodiment of the present invention.
Figure 10:
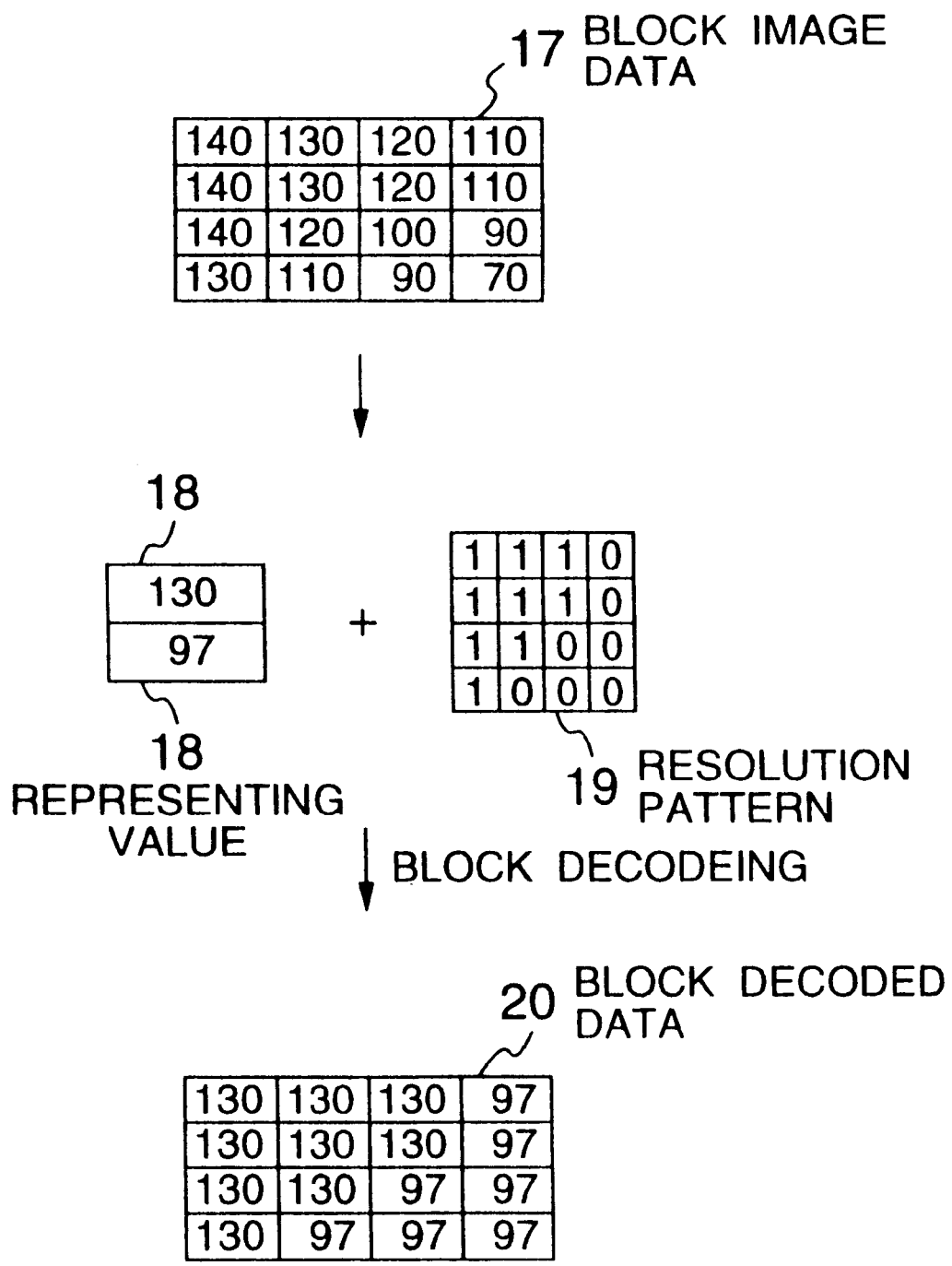
FIG. 10 is a schematic diagram used to explain a conventional image compression and expansion method.

A second embodiment of the present invention will hereinafter be described with reference to FIGS. 6 to 9. FIG. 6 is a schematic diagram used to explain an image compression method according to the second embodiment of the present invention, and FIG. 7 is a flowchart to which reference will be made in explaining the image compression method according to the second embodiment of the present invention. Also, FIG. 8 is a schematic diagram used to explain an image expansion method according to the second embodiment of the present invention, and FIG. 9 is a flowchart to which reference will be made in explaining the image expansion method according to the second embodiment of the present invention.

The image compression method according to the second embodiment of the present invention will be described with reference to FIGS. 6 and 7. Referring initially to FIG. 7, and following the start of operation, color image data with multiple gradations is inputted at a step S21. Then, control goes to the next step S22, at which the inputted color image data is divided into a plurality of blocks each of which comprises 4 pixels×4 pixels. The following processing is executed at this block unit. Then, control goes to the next step S23, at which pixel data of the first block are read out, and color block image data 8 shown in FIG. 6 is obtained. As shown in FIG. 6, the color block image data 8 comprises red block image data 8r, green block image data 8g and blue block image data 8b. Then, control goes to the next step S24, at which red, green and blue representing values 9r, 9g and 9b and their resolution patterns 10r, 10g and 10b are calculated by effecting block approximation coding on the block image data of red, green and blue color planes. In this block approximation coding, the block image data are processed similarly to the first embodiment.

Control goes to the next step S25, whereat a color plane in which a difference between the two representing values in each color plane is largest is selected, and the selected color plane is set to an integrated resolution pattern. In the example shown in FIG. 6, a difference between two representing values in the green representing value 9g is largest, so that the green resolution pattern 10g becomes the integrated resolution pattern 12. Then, control goes to the next step S26, at which representing values of respective color planes are recalculated from the block image data 8r, 8g and 8b of red, green and blue planes based on this integrated resolution pattern 12, and the recalculated resultant values are set to recalculated representing values 11r, 11g and 11b. Further, control goes to the next step S27, at which the integrated resolution pattern 12 is replaced with an integrated representing pattern 13 which is limited in number. This integrated representing pattern 13 is expressed as an integrated representing pattern number 14 at the next step S28. Then, control goes to the next step S29, at which the integrated representing pattern number 14 is memorized together with the three recalculated representing values 11r, 11g and 11b as color block coded data 15.

As described above, the compression of the image data of the first block is finished. Then, it is determined in the next decision step S30 whether or not the compression of image data of all blocks is finished. If the image data of all blocks are not yet wholly compressed as represented by a NO at the decision step S30, then control goes to the next step S31, at which image data of the next block is read out. Then, control goes back to the step S23, and the steps S23 to S29 are repeated. If the image data of all blocks are already wholly compressed as represented by a YES at the decision step S30, then control goes to the next step S32, in which the compressed image data is outputted as color image coded data, and the process of image compression is ended.

An image expansion method according to the second embodiment of the present invention will be described next with reference to FIGS. 8 and 9. Referring initially to FIG. 9, and following the start of operation, control goes to a step S33, whereat color image coded data is inputted and processed in the unit of memorized blocks. Then, control goes to the next step S34, at which block coded data of each first color plane is read out, and color block coded data 15 shown in FIG. 8 is obtained.

Then, control goes to the next step S35, at which an integrated representing pattern 13 is generated from an integrated representing pattern number 14 which is a constituent of the color block coded data 15. Control goes to the next step S36, at which block decoded data 16r, 16g and 16b of red, green and blue color planes which are the pixel levels of the blocks are reproduced from the integrated representing pattern 13 and recalculated representing values 11r, 11g and 11b of red, green and blue color planes by block approximation decoding. Then, the block decoded data 16r, 16g and 16b are memorized as color block decoded data 16 at the next step S37. As described above, the expansion of the image data of the first block is ended, and it is determined at the next decision step S38 whether or not image data of all blocks are wholly expanded. If the image data of all blocks are not yet wholly expanded as represented by a NO at the decision step S38, then control goes to the next step S39, in which image data of the next block is read out. Then, control goes back to the step S34, and the steps S34 to S37 are repeated. If the color image decoding of all blocks is already finished as represented by a YES at the decision step S38, then control goes to the next step S40, at which the expanded image data is outputted as color image decoded data. Then, the process of image expansion is ended.

In the second embodiment, as a method of selecting the representing patterns, it is possible to use a method similar to the selection method used in the first embodiment.

As described above, according the method of the present invention, it is possible to realize the image compression with an excellent compression efficiency by replacing the block pattern with the representing pattern of which the number is limited with respect to the resolution patterns.

What is claimed is:

1. An image compression method comprising the steps of:
   (a) setting a plurality of representing patterns and a plurality of binarized block patterns, each of said binarized block patterns comprising a plurality of bits and a number of said representing patterns being less than a number of said binarized block patterns, each of said representing patterns having a specific relationship with at least one of said plurality of binarized block patterns;
   (b) dividing an image with multiple gradations into a plurality of pixel blocks, each of said pixel blocks comprising a plurality of pixels;
   (c) binarizing pixel levels of said pixels in each of said pixel blocks to encode said pixel blocks to one of said plurality of binarized block patterns; and
   (d) replacing said one of said plurality of binarized block patterns with one of said representing patterns which has said specific relationship with said one of said plurality of binarized block patterns;
   wherein step (d) comprises inverting polarities of a predetermined number of bits of said one of said plurality of binarized block patterns to replace said one of said plurality of binarized block patterns with said one of said representing patterns.

2. An image compression method according to claim 1, further comprising a step of replacing said representing patterns with identifying symbols, each of said identifying symbols being previously assigned to each of said representing patterns.

3. An image compression method according to claim 1, wherein in step (d) said one of said binarized block patterns is replaced with said one of said representing patterns by a Hamming code method.

4. An image compression method according to claim 2, wherein in step (d) said one of said binarized block patterns is replaced with said one of said representing patterns by a Hamming code method.

5. An image compression method according to claim 1, wherein said binarizing step includes a step of binarizing said pixel levels of said pixels in each of said pixel blocks using two representing values; and said image compression method further comprises a step of compressing said image with multiple gradations using said two representing values and said representing patterns.

6. An image compression method according to claim 1, wherein each of said representing patterns is represented with a same bit number as each of said binarized block patterns.

7. An image compression method according to claim 1, wherein each of said representing patterns has said specific relationship with at least two of said plurality of binarized block patterns and step (d) comprises inverting polarities of an equal number of bits of each of said at least two of said plurality of binarized block patterns to replace said at least two of said plurality of binarized block patterns with said one of said representing patterns.

8. An image compression method comprising the steps of:
   (a) setting a plurality of representing patterns and a plurality of integrated block patterns, each of said integrated block patterns comprising a plurality of bits and a number of said representing patterns being less than a number of said integrated block patterns, each of said representing patterns having a specific relationship with at least one of said plurality of integrated block patterns;
   (b) dividing a color image with multiple gradations into a plurality of pixel blocks, each of said pixel blocks comprising a plurality of pixels;
   (c) binarizing pixel levels of said pixels in each of said pixel blocks to encode said pixel blocks to one of a plurality of binarized block patterns, for each one of a plurality of colors;
   (d) generating one of said integrated block patterns using said binarized block patterns for said colors to which said pixel blocks for said colors are encoded, respectively; and
   (e) replacing said one of said plurality of integrated block patterns with one of said representing patterns which has the specific relationship with said one of said plurality of integrated block patterns;
   wherein step (e) comprises inverting polarities of a predetermined number of bits of said one of said plurality of integrated block patterns to replace said one of said plurality of integrated block patterns with said one of said representing patterns.

9. An image compression method according to claim 8, further comprising a step of replacing said representing patterns with identifying symbols, each of said identifying symbols being previously assigned to each of said representing patterns.

10. An image compression method according to claim 8, wherein in step (e) said one of said integrated block patterns is replaced with said one of said representing patterns by a Hamming code method.

11. An image compression method according to claim 9, wherein in step (e) said one of said integrated block patterns is replaced with said representing patterns by a Hamming code method.

12. An image compression method according to claim 8, wherein said binarizing step includes binarizing said pixel levels of said pixels in each of said pixel blocks using two representing values, for each one of said plurality of colors; and said image compression method further comprises a step of compressing said color image with multiple gradations using said two representing values for each of said colors and said representing patterns.

13. An image compression method according to claim 12, wherein said step of generating said one of said integrated block patterns further comprises using one of said binarized block patterns for encoding in which said pixel blocks for one of said colors has a largest difference value of said two representing values; and said image compression method further comprises a step of re-setting said two representing values for each of all other colors using said one of said integrated block patterns.

14. An image compression method according to claim 8, wherein each of said representing patterns is represented with a same bit number as each of said binarized block patterns.

15. An image compression method according to claim 8, wherein each of said representing patterns has said specific relationship with at least two of said plurality of integrated block patterns and step (e) comprises inverting polarities of an equal number of bits of each of said at least two of said plurality of integrated block patterns to replace said at least two of said plurality of integrated block patterns with said one of said representing patterns.

* * * * *